(12) United States Patent
Mukerjee (10) Patent No.: US 7,689,051 B2
(45) Date of Patent: Mar. 30, 2010

(54) PREDICTIVE LOSSLESS CODING OF IMAGES AND VIDEO

(75) Inventor: Kunal Mukerjee, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1084 days.

(21) Appl. No.: 10/826,842

(22) Filed: Apr. 15, 2004

(65) Prior Publication Data

US 2005/0232501 A1   Oct. 20, 2005

(51) Int. Cl.
*G06K 9/36* (2006.01)
*G06K 9/46* (2006.01)
*H03M 7/34* (2006.01)
*H03M 7/38* (2006.01)
*G06F 7/00* (2006.01)
*H04N 11/04* (2006.01)

(52) U.S. Cl. ............... 382/244; 382/245; 382/238; 382/239; 382/236; 341/51; 348/403.1; 348/409.1; 708/203

(58) Field of Classification Search ............ 382/236, 382/238, 239, 244, 245; 341/51
See application file for complete search history.

(56) References Cited

U.S. PATENT DOCUMENTS

| | | | | |
|---|---|---|---|---|
| 5,043,728 A | * | 8/1991 | Hoshi et al. ............... | 341/106 |
| 5,680,129 A | * | 10/1997 | Weinberger et al. ......... | 341/65 |
| 5,708,511 A | * | 1/1998 | Gandhi et al. ............... | 382/239 |
| 5,881,176 A | * | 3/1999 | Keith et al. ................. | 382/248 |
| 6,005,622 A | * | 12/1999 | Haskell et al. .......... | 375/240.24 |
| 6,028,963 A | | 2/2000 | Kajiwara ..................... | 382/239 |
| 6,101,282 A | * | 8/2000 | Hirabayashi et al. ........ | 382/246 |
| 6,272,180 B1 | * | 8/2001 | Lei ........................ | 375/240.16 |
| 6,317,520 B1 | * | 11/2001 | Passaggio et al. ........... | 382/238 |
| 6,483,946 B1 | * | 11/2002 | Martucci et al. ........... | 382/240 |
| 6,519,284 B1 | | 2/2003 | Benetiere et al. | |
| 6,529,633 B1 | | 3/2003 | Payne et al. | |
| 6,549,671 B1 | * | 4/2003 | Miyagoshi et al. ......... | 382/239 |
| 6,553,148 B2 | * | 4/2003 | Zeng et al. .................. | 382/240 |
| 6,560,365 B1 | * | 5/2003 | Nakayama et al. ......... | 382/233 |
| 6,621,934 B1 | * | 9/2003 | Yu et al. .................... | 382/252 |
| 6,633,677 B1 | * | 10/2003 | Dube et al. ................ | 382/238 |
| 6,654,503 B1 | * | 11/2003 | Sudharsanan et al. ...... | 382/244 |

(Continued)

FOREIGN PATENT DOCUMENTS

EP        1404133 A1    3/2004

OTHER PUBLICATIONS

Malvar, H. and Sullivan, G.;YCoCg-R: A Color Space with RGB Reversibility and Low Dynamic Range; Aug. 12, 2003; Microsoft Corporation, pp. 1-8.*

(Continued)

*Primary Examiner*—Bhavesh M Mehta
*Assistant Examiner*—Mia M Thomas
(74) *Attorney, Agent, or Firm*—Klarquist Sparkman, LLP (57) ABSTRACT

Predictive lossless coding provides effective lossless image compression of both photographic and graphics content in image and video media. Predictive lossless coding can operate on a macroblock basis for compatibility with existing image and video codecs. Predictive lossless coding chooses and applies one of multiple available differential pulse-code modulation (DPCM) modes to individual macro-blocks to produce DPCM residuals having a closer to optimal distribution for run-length, Golomb Rice RLGR entropy encoding. This permits effective lossless entropy encoding despite the differing characteristics of photographic and graphics image content.

19 Claims, 6 Drawing Sheets

U.S. PATENT DOCUMENTS

| | | | |
|---|---|---|---|
| 6,711,295 B2* | 3/2004 | Nakayama et al. | 382/232 |
| 6,731,811 B1* | 5/2004 | Rose | 382/238 |
| 6,785,425 B1* | 8/2004 | Feder et al. | 382/247 |
| 6,891,974 B1* | 5/2005 | Malvar et al. | 382/232 |
| 6,944,350 B2* | 9/2005 | Budge et al. | 382/240 |
| 6,987,468 B1* | 1/2006 | Malvar | 341/59 |
| 7,015,837 B1* | 3/2006 | Malvar | 341/59 |
| 7,016,547 B1* | 3/2006 | Smirnov | 382/245 |
| 7,126,506 B2* | 10/2006 | Malvar | 341/63 |
| 7,133,452 B1* | 11/2006 | Rault | 375/240.16 |
| 7,161,982 B2* | 1/2007 | Kimoto | 375/240.13 |
| 7,245,235 B2* | 7/2007 | Malvar | 341/51 |
| 7,260,826 B2* | 8/2007 | Zhang et al. | 725/94 |
| 7,266,247 B2* | 9/2007 | Kim et al. | 382/236 |
| 7,437,010 B2* | 10/2008 | Budge et al. | 382/239 |
| 2002/0080408 A1* | 6/2002 | Budge et al. | 358/261.2 |
| 2002/0085768 A1* | 7/2002 | Yokose et al. | 382/248 |
| 2002/0094028 A1* | 7/2002 | Kimoto | 375/240.14 |
| 2003/0039396 A1* | 2/2003 | Irvine et al. | 382/233 |
| 2003/0118242 A1* | 6/2003 | Nakayama et al. | 382/245 |
| 2003/0202705 A1* | 10/2003 | Sun | 382/236 |
| 2005/0013370 A1* | 1/2005 | Kim et al. | 375/240.16 |
| 2007/0031053 A1* | 2/2007 | Chiang et al. | 382/244 |
| 2008/0008395 A1* | 1/2008 | Liu | 382/244 |
| 2008/0085769 A1* | 4/2008 | Lutnick et al. | 463/41 |

OTHER PUBLICATIONS

Wu. "Lossless Compression of Continuous-Tone Images via Context Selection, Quantization, and Modeling" IEEE Transactions on Image Processing, vol. 6, No. 5, May 1997, pp. 656-664.*

Link et al. "Optimal Use of Markov Models for DPCM Picture Transmission over Noisy Channels" IEEE Transactions on Communications, vol. 48, No. 10, Oct. 2000, pp. 1702-1711.*

Merhav et al "Optimal Prefix Codes for Sources with Two-Sided Geometric Distributions" IEEE Transactions on Information Theory, vol. 46, No. 1, Jan 2000, pp. 121-135.*

Reznik Coding of Prediction Residual in MPEG-4 Standard for Lossless Audio Coding, pp. 1-4.*

H. S. Malvar, "Fast Progressive Image Coding without Wavelets," pp. 243-252, *DCC* 2000, available at http://research.microsoft.com/users/malvar/#Publications.

J. Shapiro, "Embedded image coding using zero trees of wavelet coefficients," *IEEE Transactions on Signal Processing*, vol. 41, No. 12, pp. 3445-3462, Dec. 1993.

Said and Pearlman, "A new fast and efficient image codec based on set partitioning in hierarchical trees," *IEEE Transactions on Circuits and Systems for Video Technology*, vol. 6, No. 6, pp. 243-250, Jun. 1996.

J. A. Robinson, "Efficient General-Purpose Image Compression with Binary Tree Predictive Coding," *IEEE Transactions on Image Processing*, vol. 6, No. 4, Apr. 1997.

M. J. Weinberger and G. Seroussi, "The LOCO-I Lossless Image Compression Algorithm: Principles and Standardization into JPEG-LS," *IEEE Trans. Image Processing*, vol. 9, pp. 1309-1324, Aug. 2000.

H. Malvar, "Fast progressive wavelet coding," *Proc. IEEE Data Compression Conference*, Snowbird, UT, pp. 336-343, Mar.-Apr. 1999, available at http://research.microsoft.com/users/malvar/#Publications.

H. Malvar, *Signal Processing with Lapped Transforms*. Boston, MA: Artech House, 1992, Chapter 6.

M. Weinberger, G. Seroussi, G. Sapiro, "LOCO-I: A Low Complexity, Context-Based, Lossless Image Compression Algorithm," *Proc. IEEE Data Compression Conference*, Snowbird, Utah, Mar.-Apr. 1996.

A. Zandi, J. D. Allen, E. L. Schwartz, and M. Boliek, "CREW: Compression with reversible embedded wavelets," *Proc. of IEEE Data Compression Conference*, Snowbird, Utah, pp. 212-221, Mar. 1995.

M. Boliek et al., "Decoding compression with reversible embedded wavelets (CREW) codestreams," *Journal of Electronic Imaging*, vol. 7, No. 3, pp. 402-209, Jul. 1998.

U. Bayazit and W. A. Pearlman, "Algorithmic Modifications to SPIHT," *IEEE Int. Conf. on Image Processing (ICIP 2001)*, Thessaloniki, Greece., Oct. 2001.

D. Taubman and A. Zakhor, "Multirate 3-D subband coding of video," *IEEE Trans. on Image Proc.*, vol. 3, No. 5, pp. 572-588, Sep. 1994.

Memon et al., "Recent Developments in Context-Based Predictive Techniques for Lossless Image Compression", The Computer Journal, vol. 40, No. 2/3, pp. 127-136 (1997).

Mukerjee, "Decaying Tree Lossless Coding for Image and Video," Proceedings of the Data Compression Conference, 1 p., (2004).

* cited by examiner

Figure 4 DPCM MODES

MODE 1: HORIZONTAL MAJOR EDGE

MODE 2: VERTICAL MAJOR EDGE

MODE 3: RAMP DIAGONAL EDGES

MODE 4: DIAGONAL RAMP EDGE

MODE 5: DIAGONAL BAND

MODE 6: BANDED HORIZONTAL RAMPS

MODE 7: EDGE

Figure 5

```
PLC (IN ImageBand i, OUT BitStream b)
for all Macroblocks do
    find and apply the best DPCM mode
    if MB is flat then continue        // skip rest of for block
        RLGR code the DPCM residuals
end for
End PLC
```

Software 780 Implementing
Predictive Lossless Coding

PREDICTIVE LOSSLESS CODING OF IMAGES AND VIDEO

TECHNICAL FIELD

The invention relates to lossless coding of images and video.

BACKGROUND

Lossless image coding has a large variety of important applications, including high quality digital photography, filmography, graphics, etc. It also applies to professional grade video coding, for encoding video frames at the highest possible quality setting, i.e., losslessly. Images in these applications can have diverse characteristics, which presents a difficult challenge for designing an image codec to be generically applicable across these applications. For example, images in graphics typically have sharp edges or transitions in color (e.g., between text and background colors, and at borders of adjacent shapes), whereas photographic images generally are continuous tone (i.e., vary continuously in color (e.g., as a gradient) across the image).

Due to differences in image characteristics, most generic image codecs are either designed to compress photographic (e.g. JPEG) or graphic images (GIF). Photographic image compression usually uses a de-correlating transform like DCT or wavelets, whereas graphic image compression typically uses string based codecs such as LZ77 or LZ78. In general, photographic codecs don't work well on graphics because the basic assumption of local smoothness or DC-bias which underlies transform methods is usually broken in graphics. Conversely, graphics codecs do poorly on photographic images because the alphabet is too large to build a good dictionary. As a result, existing image codecs for photographic images are not designed for easy interoperability with image and video codecs, nor do they handle graphics content efficiently.

For example, CALIC [as described by X. Wu, N. Memon and K. Sayood, "A Context-Based Adaptive Lossless/Nearly-Lossless Coding Scheme For Continuous-Tone Images," ISO, 1995], JPEG-LS [as described by M. J. Weinberger and G. Seroussi, "The LOCO-I Lossless Image Compression Algorithm: Principles and Standardization into JPEG-LS," *IEEE Trans. Image Processing*, Vol. 9, pp. 1309-1324, August 2000] and SPIHT [as described by Said and W. A. Pearlman, "A New Fast And Efficient Image Codec Based On Set Partitioning In Hierarchical Trees," *IEEE Trans. On Circuits and Systems for Video Technology*, Vol. 6, No. 6, pp. 243-250, June 1996] are current state-of-art lossless image codecs for photographic images. However, they are not designed for easy interoperability with image and video codecs, nor do they handle graphics content efficiently. On the other hand, GIF is a current state-of-art lossless graphics codec. But, it too doesn't handle photographic content, nor is it easy to incorporate inside a video codec. PTC [as described by H. S. Malvar, "Fast Progressive Image Coding Without Wavelets," pp. 243-252, DCC 2000] is a macroblock-based codec that can be easily integrated into image and/or video codecs. However, it does not do very well with graphics content. Further, BTPC [described by J. A. Robinson, "Efficient General-Purpose Image Compression With Binary Tree Predictive Coding," *IEEE Transactions on Image Processing*, Vol. 6, No. 4, April 1997] is designed to handle photographic and graphic images in a unified and speed optimized design, but its compression is far from adequate.

SUMMARY

Predictive lossless coding (PLC) addresses the problem discussed above of providing lossless image compression that is generically applicable to a wide variety of images and video. A PLC implementation illustrated herein provides lossless image compression of a wide variety of photographic content (image, video and graphic alike) with compression efficiency comparable to existing lossless image codecs, and performing at faster run-time complexity than most lossless image codecs.

Various implementations of predictive lossless coding described herein achieve these results through a combination of at least some of the following points:

1. Operates on the YCoCg color space. This color space improves coding efficiency of photographic and graphic image content, and further a color space conversion to/from the prevalent RGB (red-green-blue) color representation can be performed using a fast, all integer procedure.

2. Operates on macroblocks. This ensures that the predictive lossless coding can be easily integrated into existing image and video codecs, and is conducive to scalable space/time implementations in hardware and software, e.g., using slices.

3. Uses a rich set of local, differential pulse-code modulation (DPCM) predictions at the macroblock level. These are designed to optimally decorrelate image data from photographic as well as graphics sources, without resorting to abnormal samplings or re-scanning of the image (cf., J. A. Robinson, "Efficient General-Purpose Image Compression With Binary Tree Predictive Coding," *IEEE Transactions on Image Processing*, Vol. 6, No. 4, April 1997; and X. Wu, N. Memon and K. Sayood, "A Context-Based Adaptive Lossless/Nearly-Lossless Coding Scheme For Continuous-Tone Images," ISO, 1995). The DPCM's are also designed to produce residuals that have zero biased, two-sided Laplacian distributions, as these are best coded by the run-length Golomb Rice (RLGR) entropy coding method.

4. Uses the run length Golomb Rice (RLGR) method to entropy code the various symbol distributions.

In one implementation employing this combination of points, the predictive lossless coding provides lossless compression of all photographic content (image, video and graphic alike) which is not only equal that of CALIC and greater than other existing formats including JPEG-LS, PTC, BTPC, etc., but also results in twice or greater compression for most graphic content compared to these photographic-type codecs, and offers run-time complexity which is faster by twice or greater than the most advanced state-of-the-art photographic-type codecs.

Additional features and advantages of the invention will be made apparent from the following detailed description of embodiments that proceeds with reference to the accompanying drawings.

DETAILED DESCRIPTION

The following description is directed to implementations of predictive lossless coding that combines a mix of some or all of run-length Golomb Rice (RLGR) entropy encoding, multiple DPCM modes, the YCoCg color space and a macroblock (MB) coding structure to provide an efficient and fast codec applicable to a wide variety of image content, including photographic (continuous tone), graphic, and video.

1. PLC Encoder

Figure 1:
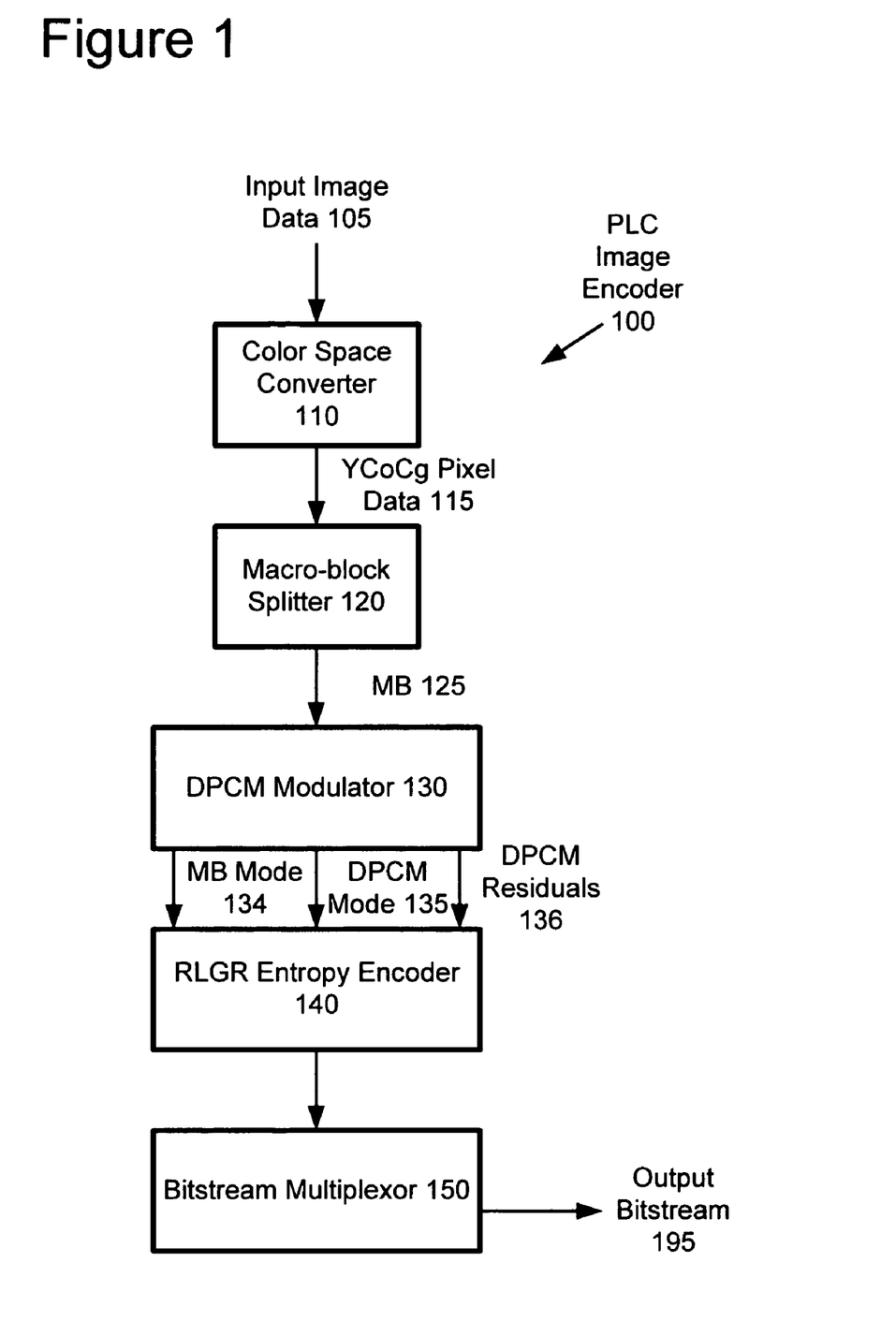
FIG. 1 is a block diagram of an image encoder utilizing predictive lossless coding.

With reference now to FIG. 1, an illustrative example of an image encoder 100 that is based on predictive lossless coding (PLC) performs encoding or compression of image data 105. The image data that is input to the PLC encoder can be in any of various uncompressed image data formats. For example, a common format processed by the illustrated image encoder is red-green-blue (RGB) image data, such as for a photographic or graphic image, a frame of video, etc. This RBG image data is generally structured as a two dimensional array of picture elements (pixels), where each pixel is represented as a red-green-blue (RGB) color sample of the image. Alternative implementations of the image encoder can use other input image data formats. It should further be recognized that this encoder can be incorporated within a video encoder for encoding a frame within a video sequence, using the predictive lossless coding.

The PLC image encoder 100 processes this image data through a set of processes, which include a color space converter 110, a macro-block splitter 120, a DPCM modulator 130, and a RLGR entropy encoder 140. The color space converter 110 converts pixels of the input image data from a displayable color space representation into the YCoCg color space, which improves coding efficiency. The macro-block splitter 120 splits the image into macro-blocks, for compatibility with macro-block and slice based image and video codecs. The DPCM encoder 130 selects and applies one of a set of available DPCM prediction modes to each individual macro-block that produces prediction residuals having a distribution suitable for RGR entropy coding. The RLGR entropy encoder 140 then encodes the prediction residuals of the macro-block. This produces a PLC encoded representation of the image data.

1.1 YCoCg Color Space Converter

More specifically, the color space converter 110 converts the color format of the input image data to the YCoCg color space. The pixels of the input image data are typically represented in a readily-displayable color space format, such as the red-green-blue (RGB) color space. The YCoCg color space is more suitable for space-efficient image coding. The YCoCg has been found to work well both for photographic and graphic images, and outperforms other color transforms in terms of coding gain. More specifically, the YCoCg lossless color space gave an improvement of ~15% as compared to the RGB color space in the PLC encoding.

The RGB to YCoCg color space conversion is done prior to any encoding of the RGB-format input image data. In this illustrated implementation of the PLC encoder 100, the color space converter 110 uses the RGB to YCoCg conversion process described in more detail in H. S. Malvar and G. J. Sullivan, "YCoCg-R: A Color Space With RGB Reversibility and Low Dynamic Range," Joint Video Team of ISO/IEC MPEG & ITU-T VCEG Doc. JVT-I014, July, 2003, which provides a way to losslessly de-correlate RGB into YCoCg color space. The RGB to YCoCg color space conversion can be effected by the forward transform defined in the following equation (1).

$$\begin{bmatrix} Y \\ C_0 \\ C_g \end{bmatrix} = \begin{bmatrix} \frac{1}{4} & \frac{1}{2} & \frac{1}{4} \\ \frac{1}{2} & 0 & -\frac{1}{2} \\ -\frac{1}{4} & \frac{1}{2} & -\frac{1}{4} \end{bmatrix} \begin{bmatrix} R \\ G \\ B \end{bmatrix} \qquad (1)$$

The decoder 600 (FIG. 6) may include a conversion back to the RGB color space. This conversion uses the inverse operation defined in equation (2).

$$\begin{bmatrix} R \\ G \\ B \end{bmatrix} = \begin{bmatrix} 1 & 1 & -1 \\ 1 & 0 & 1 \\ 1 & -1 & -1 \end{bmatrix} \begin{bmatrix} Y \\ C_0 \\ C_g \end{bmatrix} \qquad (2)$$

Lifting steps are used to obtain both forward and backward transforms, resulting in fast all integer conversion procedures. The lifting steps in the forward direction are given by—

$Co=R-B;$ $x=B+(Co/2);$ $Cg=G-x;$ $Y=x+(Cg/2);$

And in the inverse direction by—

$x=Y-(Cg/2);$ $G=x+Cg;$ $B=x-(Co/2);$ $R=Co+B;$

Figure 2:
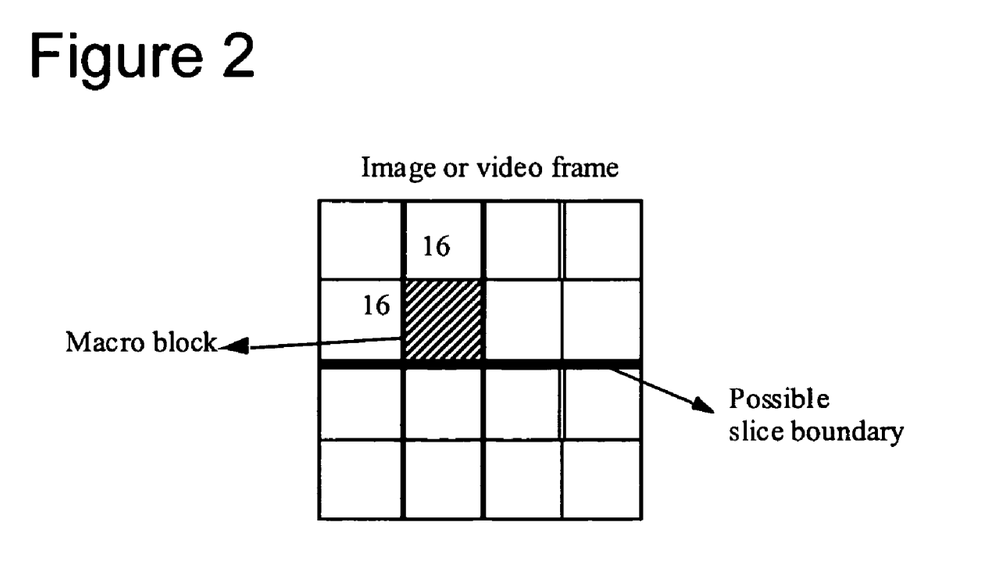
FIG. 2 is a diagram depicting a macroblock and slice structure of the predictive lossless coding utilized in the encoder of FIG. 1.

As can be seen, these lifting steps can be implemented with all integer adds, subtracts and bit shifts, all of which are extremely fast 1.2 Macro Block Coding The macro-block splitter 120 splits the image into macro blocks (MBs), as depicted in FIG. 2. In one implementation of the image encoder 100, each MB is 16×16 pixels in size. Alternative implementations can use other sizes of macroblocks. This macro-block structure makes it practical and easy to plug the PLC-based image encoder into popular image as well as video codecs. It also enables hardware and software implementations to easily use slice coding, in which the encoded bit stream is packetized into slices. The slices are typically some integer number of rows of MBs. This makes for a flexible memory footprint, and easily lends itself to space/time scalability (e.g., by using parallel or multi-threaded execution units).

The macro-block splitter splits each plane of the YCoCg color space into MBs, and encodes them separately. With each individual MB, the PLC image encoder 100 encodes the following syntax elements: a DPCM mode, a MB mode and the DPCM residuals.

The DPCM mode element identifies the DPCM mode chosen by the DPCM modulator 130 to decorrelate data in this MB. In this implementation, the DPCM modulator chooses from eight possible DPCM modes, although fewer or more DPCM modes may be used in alternative PLC encoder implementations. The macro-block splitter uses a separate RLGR context to encode the DPCM mode for the MB.

For the MB mode element, the macro-block splitter uses a two symbol alphabet, with a separate dedicated RLGR coding context. The MB mode signals one of the following two events—a) The MB encodes DPCM values; or b) The MB is "flat", and is therefore skipped. In the latter case, the event is treated as an early exit from encoding/decoding the MB's pixels as DPCM residuals, as the DPCM mode element is sufficient to re-generate all the pixel values. This flat macro-block mode coding is described in more detail below.

Finally, if the MB is not skipped, the DPCM residuals are encoded in the MB segment of the PLC-encoded output stream.

1.3 DPCM Modes

The DPCM modulator 130 chooses and applies a DPCM mode for the current MB that more optimally decorrelates the MB to produce DPCM residuals that compress better with RLGR entropy coding. The RLGR entropy coding achieves its best coding performance when its input values have a zero-biased, two-sided Laplacian distribution. For example, the DPCM modulator 130 in the illustrated PLC-based encoder can switch between eight different DPCM modes to decorrelate each MB. Alternative implementations can include fewer or more DPCM modes. These various different DPCM modes are designed to produce residuals having this optimal distribution for various different MB pixel patterns. This allows different dominant edge directions that may fall inside the MB to be coded efficiently.

Figure 3:
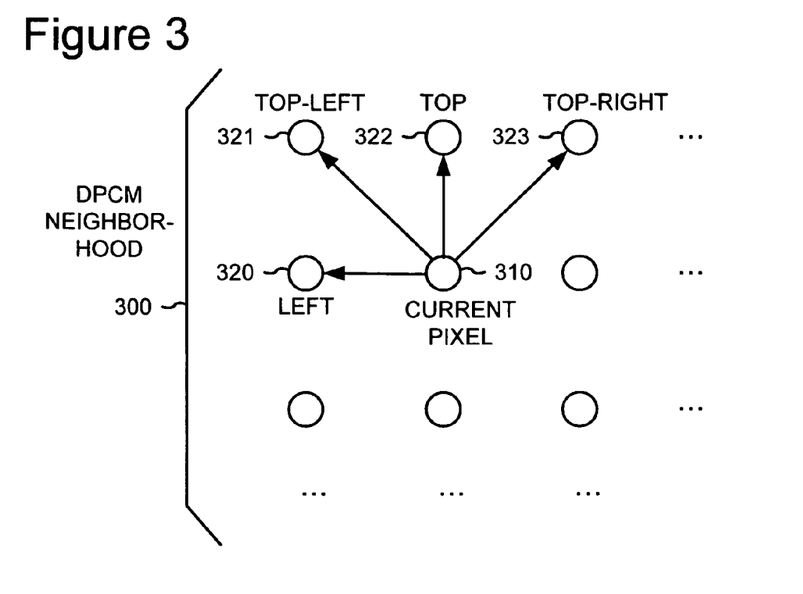
FIG. 3 is a diagram showing the neighborhood for a pixel in the macroblock on which the DPCM prediction in the encoder of FIG. 1 is based.

With reference to FIG. 3, the various DPCM modes specify which of a pixel's neighbors 300 are used to predict the pixel's value. More specifically, the value of each pixel 310 of the macro block is predicted from some combination of one or more neighboring pixels 320-323. The difference obtained from subtracting a pixel's actual value from its predicted value is the DPCM residual value of that pixel. The eight DPCM modes in the illustrated DPCM modulator 130 use predictions based on combinations of the neighboring left pixel 320, top-left pixel 321, top pixel 322, and top-right pixel 323. This allows the DPCM mode to be applied in a single, one-way pass or scan through the MB (i.e., scanning each row of pixels left-to-right, from top to bottom rows of the MB).

Figure 4:
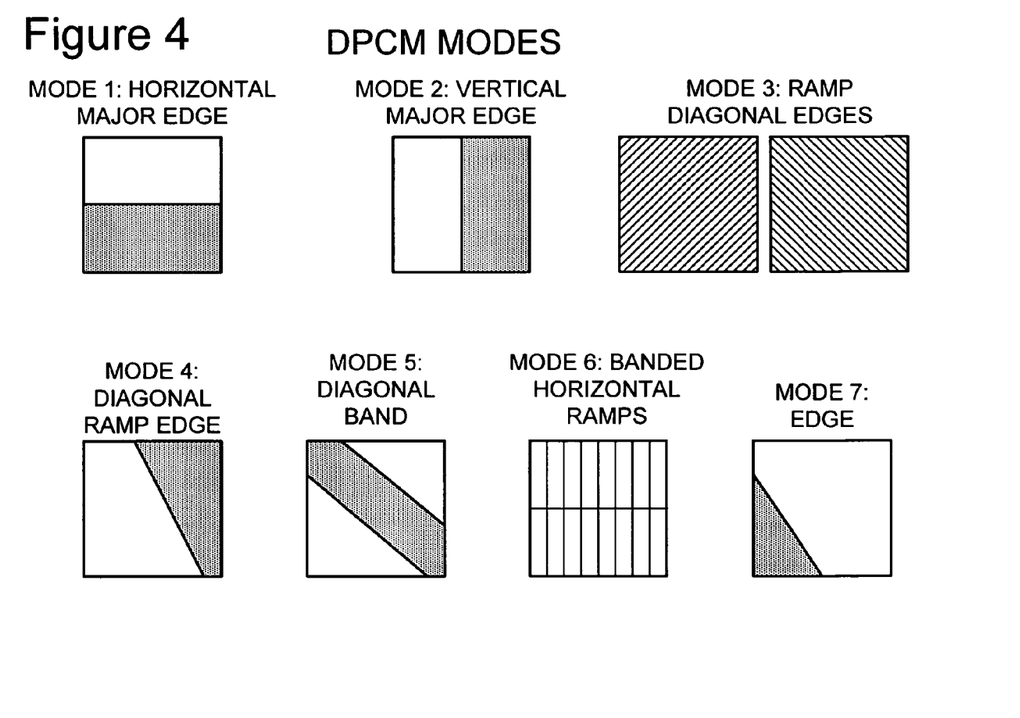
FIG. 4 is a diagram depicts DPCM prediction modes employed in the predictive lossless coding utilized in the encoder of FIG. 1.

FIG. 4 depicts the eight DPCM prediction modes used in the illustrated DPCM modulator 130. These modes are designed to decorrelate various common pixel patterns into a set of residuals having a symbol distribution that is better suited to RLGR entropy coding. More specifically, these DPCM prediction modes are as follows:

Mode 0: This is the "raw" or no DPCM mode, where individual pixels are encoded directly without any subtraction. This mode is useful for random or "speckle" type MBs with no consistently good predictor throughout the MB.

Mode 1: In this DPCM mode, the pixel value is subtracted from its immediate left neighbor prior to encoding. This mode is useful when the major edges lie along the horizontal.

Mode 2: In this DPCM mode, the pixel value is subtracted from its immediate top neighbor. This mode is useful when the major edges lie along the vertical.

Mode 3: In this DPCM mode, the value is either subtracted from the minimum of its left and top neighbors, or alternatively from the maximum of its left and top neighbors. This DPCM mode is useful for ramp diagonal edges that pass through the current pixel position.

Mode 4: In this DPCM mode, the value is subtracted from the average of its top and top right neighbors. This DPCM mode is useful for diagonal ramp edges with a different orientation.

Mode 5: In this DPCM mode, the value is subtracted from its top-left neighbor. This DPCM mode is useful for diagonal bands, e.g., in graphic content.

Mode 6: In this DPCM mode, the modulator 130 subtracts the same value from its left neighbor as the difference between its top and top-left neighbors. This mode is useful for banded horizontal ramps.

Mode 7: In this DPCM mode, the modulator 130 subtracts the average of the left and top neighbors. This is also useful when diagonal edges dominate in the MB.

The DPCM modulator tests each of the DPCM prediction modes 1 through 7 (i.e., other than the no DPCM mode, which is mode 0) so as to choose which DPCM mode produces more compressible DPCM residuals. The DPCM modulator applies the respective DPCM modes and checks the symbol distribution of the resulting residuals. The DPCM modulator then checks which prediction mode produced residuals having a distribution closest to the ideal distribution for RLGR entropy encoding. The DPCM modulator further checks whether this closest distribution is sufficiently close to the ideal zero-biased, two-sided Laplacian distribution. The DPCM modulator chooses the DPCM prediction mode with the closest-to-ideal distribution for the macro block, unless the sufficiency threshold is not met. Otherwise, if the DPCM prediction mode with the closest-to-ideal distribution does not meet the sufficiency threshold, then the DPCM modulator chooses the no DPCM mode (mode 0) as a default.

1.4 Flat MB Mode Coding

As discussed above, the PLC-based encoder 100 also can encode a MB in the flat MB mode. The flat MB mode is used when the DPCM residuals resulting from application of a DPCM mode to the MB are all zero. When testing the DPCM modes to choose the DPCM mode for use on the MB, the DPCM modulator further checks whether the currently tested DPCM mode produces all zero DPCM residuals for the MB. Upon determining that a DPCM mode produces all zero DPCM residuals, the PLC-based encoder 100 then encodes the MB in the flat MB mode—without needing to test further DPCM modes. When encoding in the flat MB mode, the PLC-based encoder 100 can encode the MB in the output bitstream as only the MB mode and the DPCM mode (i.e., skipping encoding the DPCM residuals). The coding of the flat MB mode and the DPCM mode for the MB in the output bitstream are sufficient to decode the values of the MB's pixels. Because the DPCM residuals are not encoded, the flat MB mode yields greater compression efficiency for encoding the MB.

1.5 Multiple Run Length Golomb Rice (RLGR) Contexts

With reference again to FIG. 1, the MB mode, DPCM mode and DPCM residuals produced by the DPCM modulator 130 are then entropy encoded using RLGR coding in the RLGR entropy encoder 140. The RLGR entropy encoder in the illustrated PLC-based encoder 100 uses the run-length Golomb-Rice coding process described in H. Malvar, "Fast Progressive wavelet coding," *Proc. IEEE Data Compression Conference*, Snowbird, Utah, pp. 336-343, March-April 1999. This RLGR coding process is not a truly generic entropy coder, such as an adaptive arithmetic coder. The RLGR coding makes the assumption that the most probable symbol is zero. So, if a string of numbers with the most probable symbol not being zero is fed to RLGR, the RLGR coding will have poor coding performance. If its input comes from a source with nearly Laplacian symbol distribution, the RLGR coding process will encode that data very well, quite closely to the entropy, and in many cases it will do a better job than adaptive arithmetic encoding. In the PLC-based encoder 100, the DPCM prediction modes are designed to produce zero-biased two-sided Laplacian distributions of signed integers (for both photographic and graphic images) of common photographic and graphic image content, on which RLGR works best.

The RLGR entropy encoder 140 in the illustrated PLC-based encoder uses a separate RLGR context for each of: a) the MB mode (flat or not); b) the DPCM mode; c) the DPCM residual values (zero biased two-sided Laplacian distributions of integers). In each of these contexts, the RLGR entropy encoder performs an adaptive run-length/Golomb-Rice binary encoding of the binary string formed by the significant bits that come from the symbols being coded by the separate context, e.g., the DPCM residuals for the DPCM residual values context. The use of multiple RLGR contexts to code different symbol distributions improves the entropy coding performance. This is because it is very important to adapt to each individual distribution and its idiosyncratic skew. As an example, the MB modes are more likely to be all not flat. Accordingly, their distribution is likely to be skewed away from the flat case. But, this could turn around if the content was graphic rather than photographic. Dedicating a specific RLGR context allows the RLGR entropy encoder in the PLC-base encoder 100 to adapt to such unimodal distributions with greater efficiency. In alternative implementations of the PLC-based encoder, more or fewer RLGR contexts can be used. The use of additional separate RLGR contexts to encode the DPCM residuals in such implementations could provide greater entropy coding gains and prevent context dilution, but three separate contexts are used in the illustrated implementation for practicality.

After entropy encoding by the RLGR entropy encoder, the bitstream multiplexor 150 assembles the RLGR encoded data for the MB into an output bitstream 195. In implementations using slice coding, the bitstream multiplexor assembles or packetizes the encoded MBs into slices.

1.6 Pseudo-Code Listing

Figure 5:
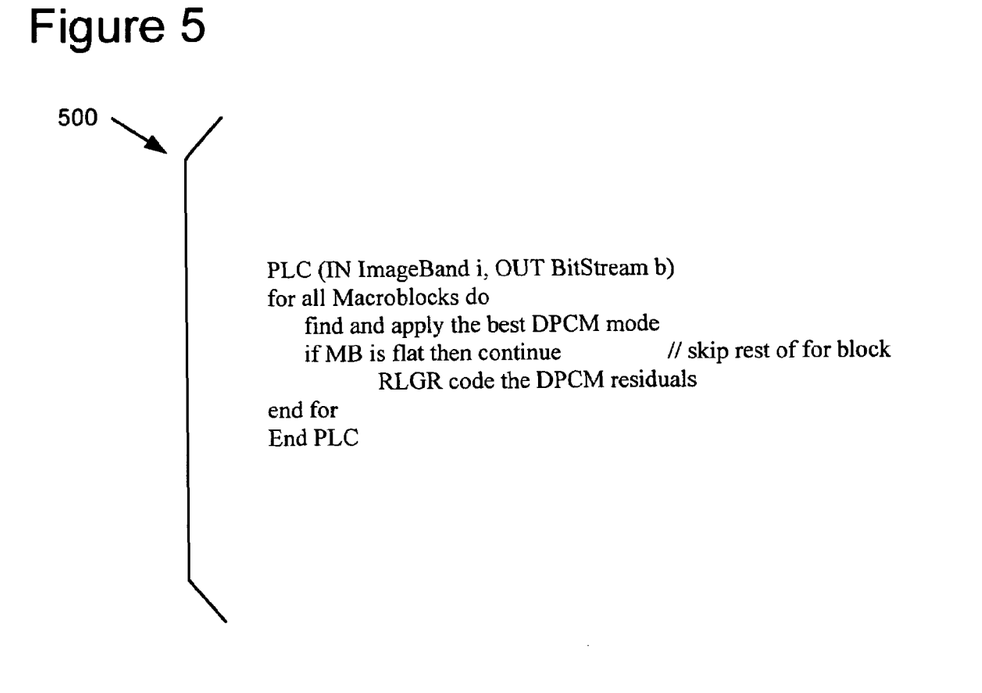
FIG. 5 is a pseudo-code listing of the encoding procedure for the predictive lossless coding utilized in the encoder of FIG. 1.

The PLC coding performed in the above-described PLC-based encoder 100 is summarized in the pseudo-code listing 500 shown in FIG. 5. In this pseudo-code listing, the "Image-Band" input parameter represents image data from one of the color space co-ordinates, i.e. Y, Co or Cg. This PLC coding process is invoked after the color space conversion of the image to the YCoCg color space.

2. PLC Decoder

Figure 6:
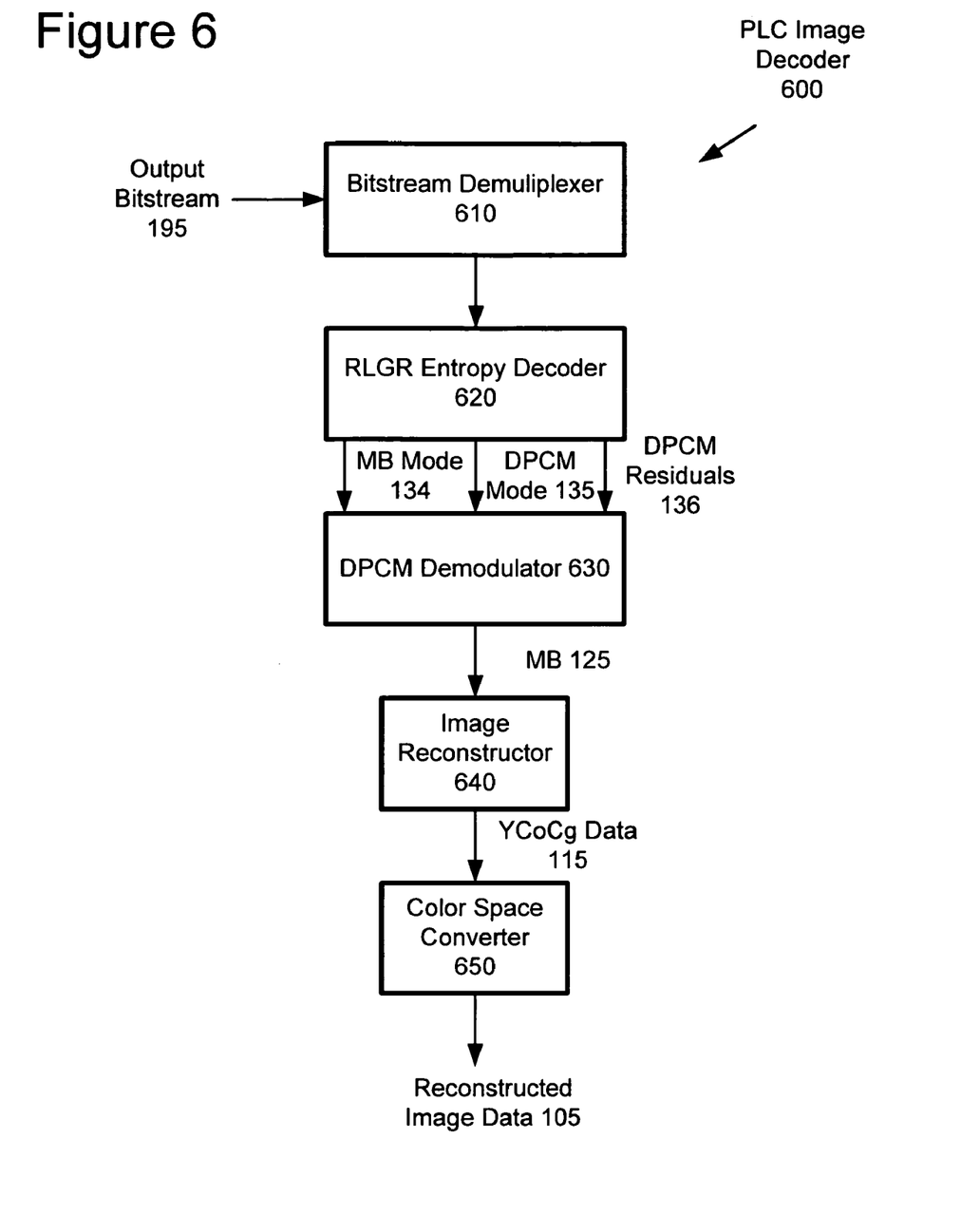
FIG. 6 is a block diagram of an image decoder utilizing predictive lossless coding.

With reference now to FIG. 6, an image decoder 600 based on predictive lossless coding (PLC) performs decoding of the output bitstream 195 produced from PLC-coding by the PLC-based image encoder 100. In this PLC-based image decoder 600, a bitstream demultiplexer 610 first separates out individual encoded MBs in the bitstream, and the encoded MB mode, the DPCM mode and DPCM residuals for that MB. The bitstream demultiplexer provides the separate data to an RLGR decoder 620.

The RLGR decoder 620 decodes the RLGR-encoded MB mode, DPCM mode and DPCM residuals for each MB. The RLGR decoder 620 uses the RLGR decoding process as described in H. Malvar, "Fast Progressive wavelet coding," *Proc. IEEE Data Compression Conference*, Snowbird, Utah, pp. 336-343, March-April 1999. The RLGR decoder 620 then provides the decoded data to a DPCM demodulator 630.

The DPCM demodulator 630 performs the inverse process on the DPCM residuals for the DPCM prediction mode that was used for the MB, thus restoring the MB data. For a MB encoded in flat MB mode, the DPCM demodulator 630 performs the inverse process for all zero residuals for the decoded DPCM prediction mode.

After the inverse DPCM prediction is applied, an image reconstructor 640 reassembles the MBs to reconstruct the image. A color space converter 650 then performs the inverse of the YCoCg color space conversion to convert this image data back into an RGB image. In some implementations, this conversion can be omitted, and the image left in the YCoCg color space format.

3. Computing Environment

The above described PLC-based encoder 100 and/or decoder 600 (PLC codec) can be implemented on any of a variety of image and video processing devices and computing devices, including computers of various form factors (personal, workstation, server, handheld, laptop, tablet, or other mobile), distributed computing networks and Web services, and image and video recorders/players/receivers/viewers, as a few general examples. The PLC-based codec can be implemented in hardware circuitry, as well as in codec software 780 executing within a computer or other computing environment, such as shown in FIG. 7.

Figure 7:
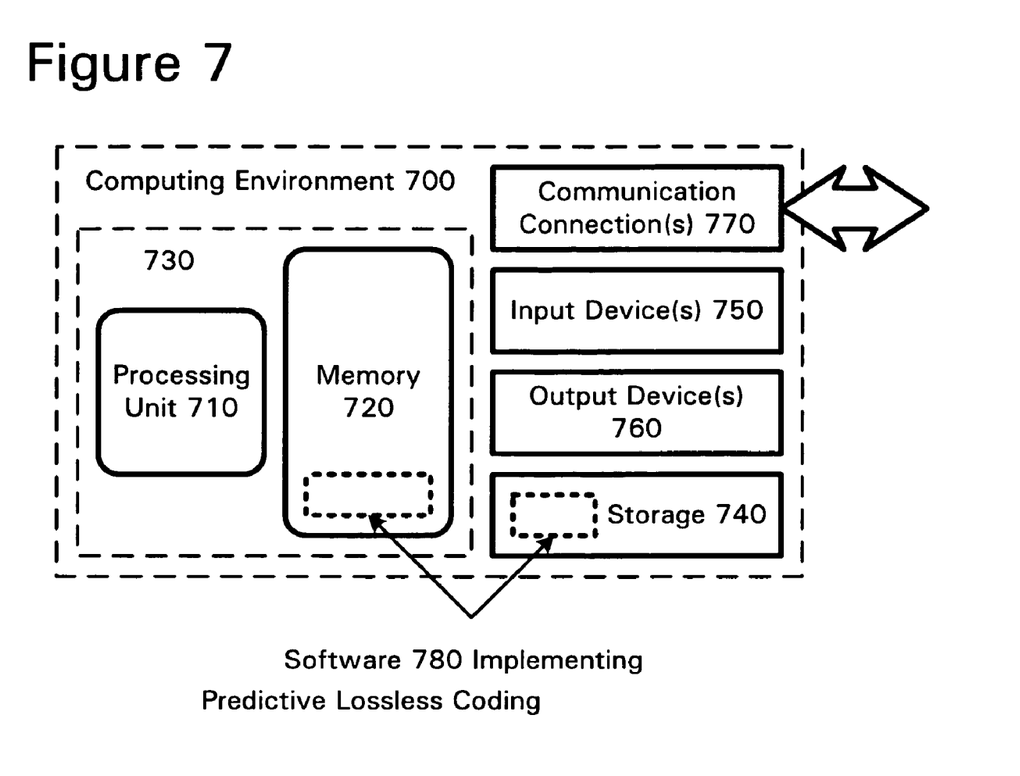
FIG. 7 is a block diagram of a suitable computing environment for implementing the PLC codec of FIGS. 1 and 6.

FIG. 7 illustrates a generalized example of a suitable image/video processing device in a computing environment 700 (e.g., of a computer) in which the described techniques can be implemented. This environment 700 is not intended to suggest any limitation as to scope of use or functionality of the invention, as the present invention may be implemented in diverse general-purpose or special-purpose image/video processing environments.

With reference to FIG. 7, the computing environment 700 includes at least one processing unit 710 and memory 720. In FIG. 7, this most basic configuration 730 is included within a dashed line. The processing unit 710 executes computer-executable instructions and may be a real or a virtual processor. In a multi-processing system, multiple processing units execute computer-executable instructions to increase processing power. The memory 720 may be volatile memory (e.g., registers, cache, RAM), non-volatile memory (e.g., ROM, EEPROM, flash memory, etc.), or some combination of the two. The memory 720 stores software 780 implementing the PLC-based codec.

A computing environment may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The storage 740 may be removable or non-removable, and includes magnetic disks, magnetic tapes or cassettes, CD-ROMs, CD-RWs, DVDs, or any other medium which can be used to store information and which can be accessed within the computing environment 700. The storage 740 stores instructions for the PLC-based codec software 780.

The input device(s) 750 (e.g., for devices operating as a control point in the device connectivity architecture 100) may be a touch input device such as a keyboard, mouse, pen, or trackball, a voice input device, a scanning device, or another device that provides input to the computing environment 700. For audio, the input device(s) 750 may be a sound card or similar device that accepts audio input in analog or digital form, or a CD-ROM reader that provides audio samples to the computing environment. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio/video or other media information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The macro expansion processing and display techniques herein can be described in the general context of computer-readable media. Computer-readable media are any available media that can be accessed within a computing environment. By way of example, and not limitation, with the computing environment 700, computer-readable media include memory 720, storage 740, and combinations of any of the above.

The techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "adjust," and "apply" to describe computer operations in a computing environment. These terms are high-level abstractions for operations performed by a computer, and should not be confused with acts performed by a human being. The actual computer operations corresponding to these terms vary depending on implementation.

In view of the many possible embodiments to which the principles of our invention may be applied, we claim as our invention all such embodiments as may come within the scope and spirit of the following claims and equivalents thereto.

I claim:

1. A method for lossless coding of image and video media, comprising:
splitting input image data into block portions;
for an individual one of the block portions, selecting one of multiple available differential pulse code modulation (DPCM) prediction modes to apply to the block portion based upon which DPCM prediction mode, out of the available DPCM prediction modes, yields a closer to optimal two-sided, zero-biased symbol distribution of a run-length, Golomb-Rice (RLGR) entropy encoder than any other of the available DPCM prediction modes;
applying the selected DPCM prediction mode to the block portion;
entropy encoding DPCM residuals of the block portion using run-length Golomb-Rice encoding; and
outputting the encoded DPCM residuals of the block portion in a bitstream.

2. The method of claim 1 further comprising:
converting the input image data into a YCoCg color space format.

3. The method of claim 1 further comprising encoding the DPCM prediction mode and DPCM residuals with separate run-length, Golomb-Rice coding contexts.

4. The method of claim 1 further comprising:
determining whether application of the selected DPCM prediction mode to the block portion produces all zero valued DPCM residuals; and
if so, encoding the block portion without entropy encoding DPCM residuals of the block portion.

5. The method of claim 1 wherein the selecting the DPCM prediction mode comprises:
determining whether the DPCM prediction mode yielding the closer to optimal symbol distribution for entropy coding meets a threshold parameter; and
if the threshold parameter is not met, applying no DPCM to the macro-block before the entropy encoding.

6. The method of claim 1 wherein the DPCM prediction modes comprise modes designed to produce an optimal distribution for entropy coding for block portions whose image content is predominantly a horizontal major edge, a vertical major edge, ramp diagonal edges, bands, and banded horizontal ramps.

7. The method of claim 1 wherein the DPCM prediction modes comprise:
a first mode in which a pixel's value is subtracted from its left neighboring pixel;
a second mode in which a pixel's value is subtracted from its top neighboring pixel;
a third mode in which a pixel's value is subtracted from a minimum or maximum of its left and top neighboring pixels;
a fourth mode in which a pixel's value is subtracted from an average of its top and top right neighboring pixels;
a fifth mode in which a pixel's value is subtracted from its top-left neighboring pixel;
a sixth mode in which the difference between a pixel's top and top-left neighboring pixels is subtracted from its left neighboring pixel; and
a seventh mode in which a pixel's value is subtracted from an average of the pixel's left and top neighboring pixels.

8. A computer-implemented media system providing predictive lossless coding of image or video media content, the system comprising a computer comprising one or more computer-readable storage media and a processor, the computer-readable storage media containing instructions, which, when executed by the processor on the computer, cause the computer to perform the actions of:
a macro-block division process for separating input image data into macro-blocks;
a multi-mode differential pulse code modulation (DPCM) process operating on an individual macro-block of the input image data to choose one of multiple DPCM prediction modes based upon which one of the multiple DPCM prediction modes produces a residual distribution for the macro-block to more closely match an optimal two-sided, zero-biased, run-length, Golomb-Rice (RLGR) entropy coding distribution than any other of the multiple DPCM prediction modes, and applies the chosen DPCM prediction mode to the macro-block; and an entropy coding process for performing a run-length, Golomb-Rice coding of the DPCM residuals of the macro-block.

9. The computer-implemented media system of claim 8 further comprising a color space conversion process for converting the input image data prior to a YCoCg color space format prior to coding.

10. The computer-implemented media system of claim 8 wherein the DPCM prediction modes comprise modes designed to produce distributions close to the optimal two-sided, zero-biased RLGR entropy coding distribution for macro-blocks whose image content is predominantly a horizontal major edge, a vertical major edge, ramp diagonal edges, bands, and banded horizontal ramps.

11. The computer-implemented media system of claim 8 wherein the DPCM prediction modes comprise:

a first mode in which a pixel's value is subtracted from its left neighboring pixel;

a second mode in which a pixel's value is subtracted from its top neighboring pixel;

a third mode in which a pixel's value is subtracted from a minimum or maximum of its left and top neighboring pixels;

a fourth mode in which a pixel's value is subtracted from an average of its top and top right neighboring pixels;

a fifth mode in which a pixel's value is subtracted from its top-left neighboring pixel;

a sixth mode in which the difference between a pixel's top and top-left neighboring pixels is subtracted from its left neighboring pixel; and a seventh mode in which a pixel's value is subtracted from an average of the pixel's left and top neighboring pixels.

12. A computer-readable storage medium having computer-executable program instructions stored thereon, operative upon execution in a computer media processing system to perform a method of encoding image or video data, the method comprising:

converting image data to a YCoCg color space format;

splitting the image data into macro-blocks;

for a macro-block of the image data, determining a DPCM differential pulse code modulation prediction mode based upon which DPCM prediction mode from a group of available DPCM prediction modes produces residuals closest to an optimal two-sided, zero-biased distribution for RLGR (run-length Golomb-Rice) coding than any other of the available DPCM prediction modes;

if such determined DPCM prediction mode produces residuals whose distribution meets a threshold parameter, applying the DPCM prediction mode to the macro-block; and RLGR entropy encoding the residuals of the macro-block.

13. The computer-readable storage medium of claim 12 wherein the method further comprises:

determining whether application of the determined DPCM prediction mode to the macro-block produces flat residuals; and if so, encoding the macro-block without the RLGR entropy encoding the residuals of such flat macro-block.

14. The computer-readable storage medium of claim 13 wherein the method further comprises:

RLGR entropy encoding the macro-block mode indication using a separate RLGR coding context than for RLGR entropy encoding the residuals.

15. The computer-readable storage medium of claim 13 wherein the method further comprises:

determining whether the DPCM prediction mode producing a residual distribution closest to the optimal two-sided, zero-biased distribution produces a residual distribution that meets the threshold parameter; and if the threshold parameter is not met, RLGR entropy encoding the macro-block without applying the DPCM prediction mode to the macro-block.

16. A method of decoding predictive losslessly coded data of an image or video, comprising:

RLGR (run-length Golomb-rice) entropy decoding a macro-block mode, a DPCM differential pulse code modulation prediction mode and DPCM residuals for each of a plurality of macro-blocks using separate RLGR coding contexts;

where the macro-block mode of a macro-block is a flat macro-block mode, decoding the macro-block's pixels using a DPCM demodulation that is an inverse of the RLGR-decoded DPCM prediction mode of all zero residuals;

otherwise, where the DPCM prediction mode of the macro-block is a no DPCM prediction mode because application of possible DPCM prediction modes did not yield a symbol distribution for RLGR entropy encoding meeting a threshold parameter, decoding the macro-block's pixels without DPCM demodulation;

otherwise, de-modulating the RLGR-decoded DPCM residuals using a DPCM demodulation that is an inverse of the RLGR-decoded DPCM prediction mode wherein the DPCM prediction mode was selected during encoding based upon which DPCM prediction mode from a group of available DPCM prediction modes produced residuals closer to an optimal two-sided, zero-biased distribution for RLGR coding than any other of the available DPCM prediction modes; and assembling the macro-blocks to form a decoded image data.

17. The method of claim 16 comprising:

converting the decoded image data from a YCoCg color space format to a displayable color space format.

18. A predictive-lossless coded image or video decoder, comprising:

a run-length Golomb-Rice (RLGR) entropy decoder operating to decode RLGR-encoded DPCM (differential pulse code modulation) residuals and DPCM prediction mode of a macro-block;

a DPCM demodulator for applying an inverse of the DPCM prediction mode to the DPCM residuals if the macro-block was encoded using a DPCM prediction mode wherein the DPCM prediction mode was selected during encoding based upon which DPCM prediction mode from a group of available DPCM prediction modes produced residuals closer to an optimal two-sided, zero-biased distribution for RLGR entropy encoding than any other of the available DPCM prediction modes;

otherwise, where the macro-block was not encoded using a DPCM prediction mode because application of possible DPCM prediction modes did not yield a symbol distribution for RLGR entropy encoding that met a threshold parameter, decoding the macro-block without DPCM demodulation; and a macro-block reassembler for assembling the macro-block with other decoded macro-blocks to form data of a reconstructed image.

19. The predictive-lossless coded image or video decoder of claim 18, comprising:

an inverse YCoCg converter for converting the reconstructed image from a YCoCg color space to a color space suited for displaying the image.

* * * * *

UNITED STATES PATENT AND TRADEMARK OFFICE
CERTIFICATE OF CORRECTION

PATENT NO. : 7,689,051 B2
APPLICATION NO. : 10/826842
DATED : March 30, 2010
INVENTOR(S) : Kunal Mukerjee Page 1 of 1

It is certified that error appears in the above-identified patent and that said Letters Patent is hereby corrected as shown below:

In column 11, line 47, in Claim 12, before "differential" insert -- ( --.

In column 11, line 47, in Claim 12, after "modulation" insert -- ) --.

In column 12, line 15, in Claim 16, delete "rice" and insert -- Rice --, therefor.

In column 12, line 16, in Claim 16, before "differential" insert -- ( --.

In column 12, line 17, in Claim 16, after "modulation" insert -- ) --.

Signed and Sealed this
First Day of February, 2011

David J. Kappos
*Director of the United States Patent and Trademark Office*